United States Patent
Cho et al.

(10) Patent No.: US 9,406,143 B2
(45) Date of Patent: Aug. 2, 2016

(54) ELECTRONIC DEVICE AND METHOD OF OPERATING ELECTRONIC DEVICE

(71) Applicant: Samsung Electronics Co., Ltd., Suwon-si, Gyeonggi-do (KR)

(72) Inventors: Kyu-Sung Cho, Suwon-si (KR); Dae-Kyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 14/176,663

(22) Filed: Feb. 10, 2014

(65) Prior Publication Data

US 2014/0233798 A1 Aug. 21, 2014

Related U.S. Application Data

(60) Provisional application No. 61/767,406, filed on Feb. 21, 2013.

(30) Foreign Application Priority Data

Dec. 30, 2013 (KR) .................. 10-2013-0166600

(51) Int. Cl.
*G06K 9/00* (2006.01)
*G06T 7/20* (2006.01)
(52) U.S. Cl.
CPC ........................................ *G06T 7/20* (2013.01)
(58) Field of Classification Search
None
See application file for complete search history.

(56) References Cited

U.S. PATENT DOCUMENTS

| | | | | |
|---|---|---|---|---|
| 6,072,903 A | * | 6/2000 | Maki et al. | 382/190 |
| 8,582,821 B1 | * | 11/2013 | Feldman et al. | 382/107 |
| 2006/0204035 A1 | * | 9/2006 | Guo et al. | 382/103 |
| 2007/0133840 A1 | * | 6/2007 | Cilia | G06K 9/00369 382/103 |
| 2008/0212884 A1 | * | 9/2008 | Oneda et al. | 382/232 |
| 2011/0052002 A1 | * | 3/2011 | Cobb | G06K 9/00771 382/103 |
| 2011/0286631 A1 | | 11/2011 | Wagner et al. | |
| 2011/0311100 A1 | * | 12/2011 | Fan | 382/103 |
| 2012/0099651 A1 | | 4/2012 | Robertson et al. | |
| 2012/0288140 A1 | * | 11/2012 | Hauptmann et al. | 382/103 |
| 2013/0278632 A1 | | 10/2013 | Cho et al. | |
| 2014/0226906 A1 | * | 8/2014 | Kang | 382/197 |

FOREIGN PATENT DOCUMENTS

KR 10-2013-0117303 A 10/2013

OTHER PUBLICATIONS

Xiao, Chunxia, et al. "Fast exact nearest patch matching for patch-based image editing and processing." Visualization and Computer Graphics, IEEE Transactions on 17.8 (2011): 1122-1134.*

* cited by examiner

*Primary Examiner* — Li Liu
(74) *Attorney, Agent, or Firm* — Jefferson IP Law, LLP (57) ABSTRACT

An electronic device is provided. The electronic device includes a memory configured to store a plurality of digital images and a processor, wherein the processor tracks movement of an object recognized in the plurality of digital images, and the processor detects an amount of movement between the plurality of digital images, and selects one among a plurality of object tracking methods based on at least a part of the amount of the movement.

20 Claims, 8 Drawing Sheets

FIG.9

ELECTRONIC DEVICE AND METHOD OF OPERATING ELECTRONIC DEVICE

CROSS-REFERENCE TO RELATED APPLICATION(S)

This application claims the benefit under 35 U.S.C. §119(e) of a U.S. Provisional application filed on Feb. 21, 2013 in the U.S. Patent and Trademark Office and assigned Ser. No. 61/767,406, and under 35 U.S.C. §119(a) of a Korean patent application filed on Dec. 30, 2013 in the Korean Intellectual Property Office and assigned Serial number 10-2013-0166600, the entire disclosure of each of which is hereby incorporated by reference.

TECHNICAL FIELD

The present disclosure relates to an electronic device and a method of operating the electronic device. More particularly, the present disclosure relates to an electronic device and a method of operating the electronic device, which can stably track an object in image data in the electronic device.

BACKGROUND

Augmented Reality (AR) is a technology, in which a real world object viewed through a user's own eyes and a virtual object are overlapped and are then displayed. Since a video obtained by adding a virtual world, having additional information, to a real world image is shown in real time, the AR may refer to Mixed Reality (MR). Although the AR, which is a concept for complementing the real world through the virtual world, uses a virtual environment made by computer graphics, the leading role of AR is a real world environment. The computer graphics serve to additionally provide necessary information to the real world environment. The virtual reality technology allows a user to concentrate in the virtual environment, so that the user cannot see real world environment. However, the AR technology, which is implemented by mixing the real environment and a virtual object, allows a user to see the real environment, so as to provide a better sense of reality and additional information.

Accordingly there is a need for an electronic device and a method of operating the electronic device, which can stably track an object in image data in the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method of operating the electronic device, which can stably track an object in image data in the electronic device.

Augmented Reality (AR) is frequently developed for execution in a portable electronic device. Since people can easily carry the portable electronic device, situations, where an interesting object is rapidly moving, occur frequently. In this case, since blurring may occur in image data, it is difficult to track the interesting object, so that 3 Dimensional (3D) information, which is synthesized, may disappear.

In accordance with an aspect of the present disclosure, an electronic device and a method of operating the electronic device, which can stably track an object in image data in the electronic device is provided.

In accordance with another aspect of the present disclosure, an electronic device is provided. The electronic device includes a memory configured to store a plurality of digital images and a processor, wherein the processor tracks movement of an object recognized in the plurality of digital images, and the processor detects an amount of movement between the plurality of digital images, and selects one among a plurality of object tracking methods based on at least a part of the amount of the movement.

In accordance with another aspect of the present disclosure, an electronic device is provided. The electronic device includes a memory configured to store a plurality of digital images and a processor, wherein the processor tracks movement of an object recognized in the plurality of digital images, and the processor determines at least one of (i) whether the plurality of digital images satisfies at least one of first conditions and (ii) whether a state of the electronic device satisfy at least one of second conditions, and selects one among a plurality of object tracking methods based on at least a part of the result of the determining In accordance with another aspect of the present disclosure, a method of operating an electronic device is provided. The method includes tracking movement of an object recognized from a plurality of digital images, wherein the tracking of the movement includes detecting an amount of movement between the plurality of digital images and selecting one among a plurality of object tracking methods, based on at least a part of the amount of the movement.

In accordance with another aspect of the present disclosure, a method of operating an electronic device is provided. The method includes tracking movement of an object recognized in a plurality of digital images, and wherein the tracking of the movement includes at least one of (i) determining whether the plurality of digital images satisfies at least one of first conditions and (ii) determining whether a state of the electronic device satisfy at least one of second conditions, and selecting one among a plurality of object tracking methods based on at least a part of the result of the determining Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference with the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may be a device including a communication function. For example, the electronic device may be a combination of one or more of a smartphone, a tablet personal computer, a mobile phone, a video phone, an e-book reader, a desktop personal computer, a laptop personal computer, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, a home appliance (e.g. a refrigerator, an air conditioner, a cleaner, an oven, a microwave oven, a washing machine, a vacuum cleaner, etc.), an artificial intelligent robot, a TeleVision (TV), a Digital Video Disk (DVD) player, an audio player, various medical machines (e.g. a Magnetic Resonance Angiography (MRA), a Magnetic Resonance Imaging (MRI), a Computed Tomography (CT), a tomography camera, a ultra sonography, etc.), a navigation device, a Global Positioning System (GPS) receiver, an Event Data Recorder (EDR), a Flight Data Recorder (FDR), a set-top box, a TV box (e.g. SamSung HomeSync™, Apple TV™, or Google TV™), an electronic dictionary, a vehicle infotainment device, electronic equipment for a ship (e.g. navigation equipment for a ship, a gyrocompass, etc.), avionics equipment, a security device, an electronic cloth, an electronic key, a camcorder, a game console, a Head-Mounted Display (HMD), a flat panel display device, an electronic frame, an electronic album, a piece of furniture or a part of a building or structure including a communication function, an electronic board, an electronic signature receiving device, a wearable device, and a projector. It is obvious to those skilled in the art that the electronic device according to various embodiments of the present disclosure is not limited to the above-mentioned devices.

Figure 1:
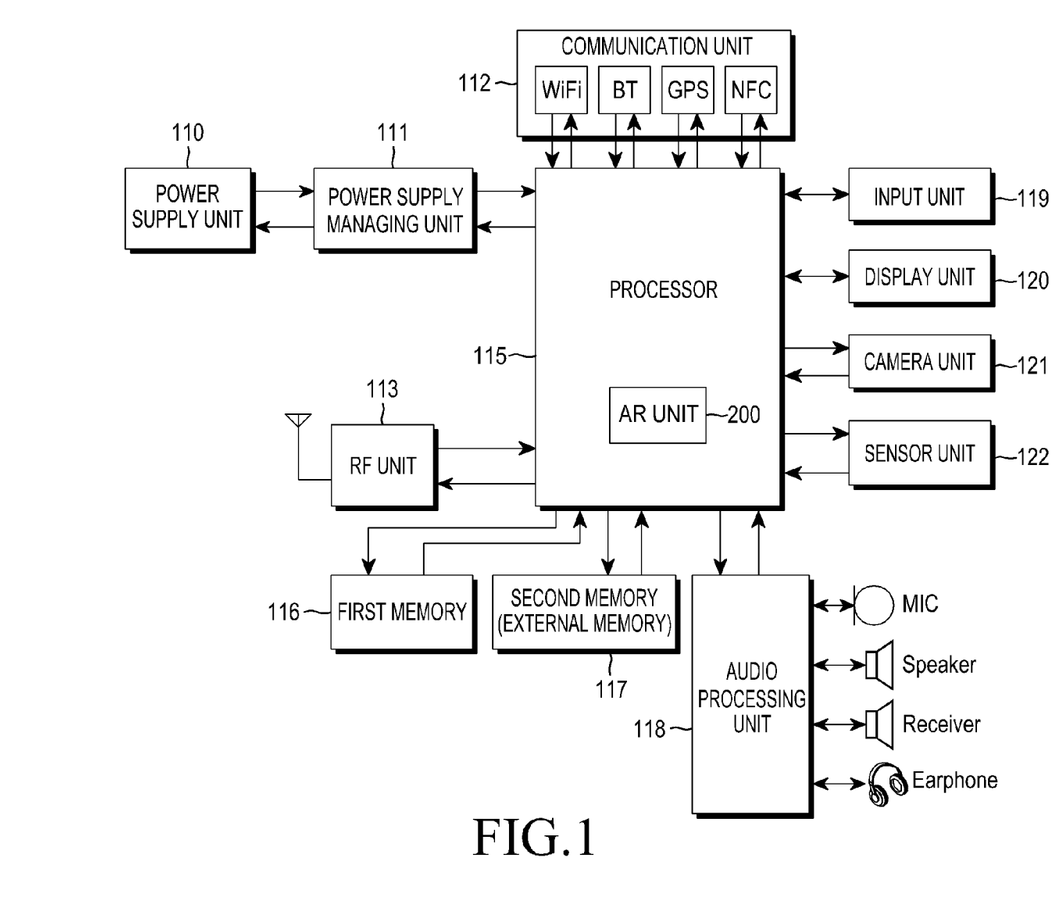
FIG. 1 illustrates a configuration of an electronic device according to an embodiment of the present disclosure.

FIG. 1 illustrates a configuration of an electronic device 100 according to an embodiment of the present disclosure.

Referring to FIG. 1, a power supply unit 110 may supply electric power to one or a plurality of batteries (not illustrated) disposed in a housing of the electronic device 100 under the control of a power supply management unit 111. The one or more batteries (not illustrated) may supply electric power to the electronic device 100. Further, the power supply unit 110 may supply electric power input from an external power source (not illustrated) through a wired cable connected to a connector of the electronic device 100. Further, the power supply unit 110 may supply electric power wirelessly input from the external power source through a wireless charging technology, to the electronic device 100.

The power supply management unit 111 may perform a control to supply electric power of the power supply unit 110 to the electronic device 100, or to supply electric power input from the external power source to the power supply unit 110, under the control of a processor 115.

A communication unit 112 allows the electronic device 100 to be connected to an external device through mobile communication by using one or a plurality of antennas (not illustrated) under the control of the processor 115.

The communication unit 112 may include at least one of a wireless Local Area Network (LAN) unit and a short distance communication unit. For example, the communication unit 112 may include only the wireless LAN unit, only the short distance communication unit, or both the wireless LAN unit and the short distance communication unit. The wireless LAN unit may access the Internet in a place where a wireless Access Point (AP) (not illustrated) is installed, under the control of the processor 115. The wireless LAN unit may support a wireless LAN standard IEEE802.11x of the Institute of Electrical and Electronics Engineers (IEEE). The short distance communication unit may wirelessly perform short distance communication under the control of the processor 115. The short distance communication scheme may include Bluetooth, Infrared Data Association (IrDA) communication, WiFi-Direct communication, Near Field Communication (NFC), etc.

The communication unit 112 may include a GPS unit, and the GPS unit may calculate a location of the electronic device 100 by receiving a radio wave from a plurality of GPS satellites (not illustrated) in Earth's orbit and using times of arrival from the GPS satellites (not illustrated) to the electronic device 100.

An RF unit 113 may transmit/receive a wireless signal for voice call, video call, a Short Message Service (SMS), or Multimedia Message Service (MMS) to/from a portable phone (not illustrated), a smart phone (not illustrated), a tablet PC, or other devices (not illustrated) of which the phone number is input to the electronic device 100.

The processor 115 may include a Read-Only Memory (ROM) for storing a control program for controlling a Central Processing Unit (CPU), a Graphics Processing Unit (GPU), and the electronic device 100, and a Random Access Memory (RAM) for storing a signal or data input from the outside of the electronic device 100 or being used as a memory area for an operation performed in the electronic device 100. The CPU may include a single core, a dual core, a triple core, or a quadruple core. The CPU, the ROM, and the RAM may be connected with each other through internal buses.

The processor 115 may control the power supply unit 110, the power supply management unit 111, the communication unit 112, the RF unit 113, a first memory 116, a second memory 117, an audio processing unit 118, an input unit 119, a display unit 120, a camera unit 121, and a sensor unit 122.

The processor 115 may include an Augmented Reality (AR) unit 200 for processing input data into AR data, and the AR unit 200 may not be included in the processor 115 and may be separately configured. A configuration of the AR unit 200 will be described in detail below with reference to FIGS. 2 to 5.

The processor 115 may process image data stored in the first memory 116 into 3D image data which can be displayed in an AR mode, according to various embodiments of the present disclosure.

The processor 115 may detect an amount of movement between the image data, and select one among a plurality of object tracking methods, based on at least a part of the amount of the movement, according to an embodiment of the present disclosure.

The plurality of object tracking methods may include a first object tracking method and a second object tracking method, and the first object tracking method may require a calculation amount more than that of the second tracking method.

In various embodiments of the present disclosure, the first object tracking method may include a descriptor matching method, and the second object tracking method may include a patch matching method.

The processor 115 may be configured to omit the tracking of an object when the amount of the movement is equal to or similar to zero, according to various embodiments of the present disclosure.

The processor 115 may determine whether the image data satisfies one or more first conditions and/or whether a state of the electronic device satisfies one or more second conditions, and select one among the plurality of object tracking methods, based on at least a part of the determined result, according to another embodiment of the present disclosure.

The processor 115 may include a configuration for determining whether an amount of movement and/or an illuminance of the image data are higher than a selected threshold value or selected threshold values, as the first condition, according to another embodiment of the present disclosure.

The processor 115 may include a configuration for determining whether a remaining amount of electric charge of a battery included in the electronic device and/or an illuminance measured by the electronic device is higher than a selected threshold value or selected threshold values, as the second condition, according to another embodiment of the present disclosure.

The first memory 116 may store a signal or data input/output in correspondence with operations of the communication unit 112, the RF unit 113, the input unit 119, the camera unit 121, the sensor unit 122, and the display unit 120 used as a touch screen unit, under the control of the processor 115. The first memory 116 may store a control program for controlling the electronic device 100 or the processor 115, and applications. The first memory 116 may store digital image data.

The second memory 117 corresponds to an external memory which can be extracted from or inserted into the electronic device 100, and may store a signal or data input/output in correspondence with operations of the communication unit 112, the RF unit 113, the input unit 119, the camera unit 121, the sensor unit 122, and the display unit 120 used as a touch screen unit, under the control of the processor 115.

The audio processing unit 118 may include a transmitter for encoding and modulating a signal to be transmitted and a receiver for decoding and demodulating a signal to be received, and may be configured by a Modulator/Demodulator (MODEM) and a Coder/Decoder (CODEC). The CODEC may include a data CODEC for processing packet data and an audio CODEC for processing an audio signal such as voice. The audio processing unit 118 may output a reception audio signal output from the audio CODEC to a speaker or an earphone connected to the electronic device, or may transmit a transmission audio signal generated by a microphone or a receiver to the processor 115 through the audio CODEC.

The input unit 119 may perform a touch input which is input to the display unit used as the touch screen unit by a user and a touch input using a touch pen.

The input unit 119 may receive a key input from a user in order to control the electronic device 100. The input unit 119 may include a physical keypad (not illustrated) formed in the electronic device 100 and a virtual keypad (not illustrated) displayed on the display unit 120 used as the touch screen unit. The physical keypad (not illustrated) formed in the electronic device 100 may be excluded according to a performance or a structure of the electronic device 100.

The display unit 120 may employ a Liquid Crystal Display (LCD) panel, in which case the display unit 120 may include an LCD controller, a memory for storing video data, an LCD element, etc. When the LCD is realized in a touch screen scheme, the display unit 120 may operate as an input unit, and at this time, a virtual keypad may be displayed on the display unit 120. Further, when the display unit 120 is realized in the touch screen scheme so that the display unit 120 is used as the touch screen unit, the touch screen unit may be formed by a Touch Screen Panel (TSP) including a plurality of sensor panels, and the plurality of sensor panels may include a capacitive sensor panel which can recognize a hand touch and an electromagnetic sensor panel which can detect a minute touch of a touch pen.

The camera unit 121 corresponds to a device for generating an image, and may include at least one of a first camera and a second camera for photographing a still image or video under the control of the processor 115. Further, the first camera or the second camera may include an auxiliary light source (e.g. a flash (not illustrated)) for providing an amount of light needed for photographing. The first camera may be disposed on a front surface of the electronic device 100, and the second camera may be disposed on a rear surface of the electronic device 100. As another scheme, the first camera and the second camera are disposed adjacent to each other (e.g. a space between the first camera and the second camera is wider than 1 cm and narrower than 8 cm), so as to photograph a 3D still image or a 3D video.

The sensor unit 122 may include at least one sensor for detecting a state of the electronic device 100. For example, the sensor unit 122 may include a proximity sensor for detecting whether a user approaches the electronic device 100, an illumination sensor (not illustrated) for detecting an amount of ambient light of the electronic device 100, a motion sensor (not illustrated) for detecting an operation (e.g. a rotation of the electronic device 100, or an acceleration or a vibration applied to the electronic device 00) of the electronic device 100, a geo-magnetic sensor (not illustrated) for detecting a point of the compass by using the Earth's magnetic field, a gravity sensor for detecting an action direction of the gravity, or an altimeter for measuring an atmospheric pressure to detect an altitude. At least one sensor may detect the state, generate a signal corresponding to the detection, and transmit the generated signal to the processor 115. The sensors of the sensor unit 122 may be added or deleted according to the performance of the electronic device 100.

Figure 2:
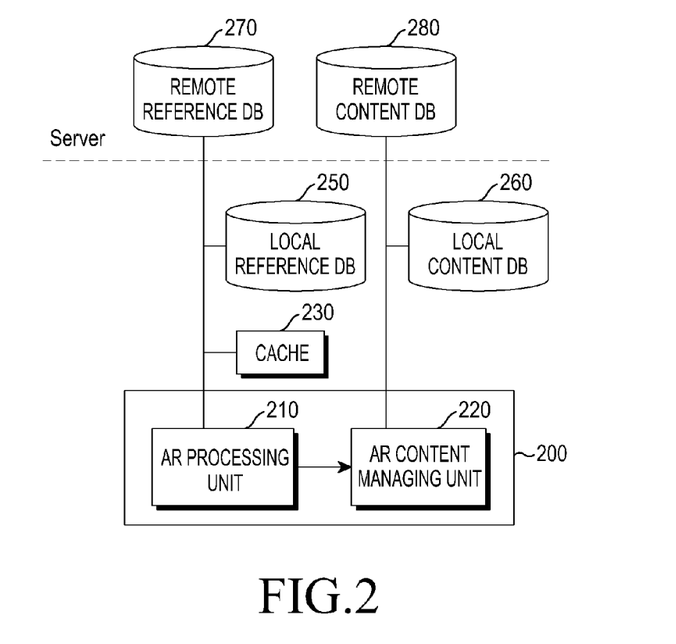
FIG. 2 illustrates a configuration of an Augmented Reality (AR) system according to an embodiment of the present disclosure.

FIG. 2 illustrates a configuration of an AR system according to an embodiment of the present disclosure.

Referring to FIG. 2, the system may include an AR unit 200 including an AR processing unit 210 and an AR content management unit 220.

The AR processing unit 210 corresponds to a main unit of the system, and may receive input data from at least one of the camera unit, the media unit, the audio unit, or the sensor unit included in the electronic device 100. The AR processing unit 210 may use other components of the electronic device 100, e.g. a memory, a CPU, or a GPU, in order to perform AR processing for the input data. In order to recognize a target in the input data, the AR processing unit 210 may process the input data and output data for the result obtained by processing the input data to the AR content management unit 220, by using a cache 230, a local reference DataBase (DB) 250, or a remote reference DB 270 in which reference data is stored.

The AR processing unit 210 may process image data received from the camera unit 121, image data and audio data received from the media unit, and audio data received from the audio unit into data for the AR. The AR processing unit 210 may generate a vibration while converting an execution mode of the electronic device 100 into an AR mode by detecting movement of the electronic device 100 or while outputting image data and audio data in the AR mode, according to types of sensor data received from the sensor unit 122.

The data for the result obtained by processing the input data may include recognition information and local information for the target of the input data. When the target is image data, the local information may be used in order to determine a 2D pose or a 3D pose, and the recognition information may be used in order to determine types of the target.

The AR content management unit 220 may detect contents corresponding to the data for the result obtained by processing the input data, in a local content DB 260 or a remote content DB 280, based on the data for the result obtained by processing the input data, and may configure video and audio output data based on the detected contents to output the video and audio output data.

In various embodiments of the present disclosure, it may be described as an example that the AR processing unit provides input image data received through the camera unit as AR image data.

In the electronic device according to various embodiments of the present disclosure, although it has been described as an example that the AR unit included in the processor performs AR processing, the processor may perform the same function as that of the AR unit.

Figure 3:
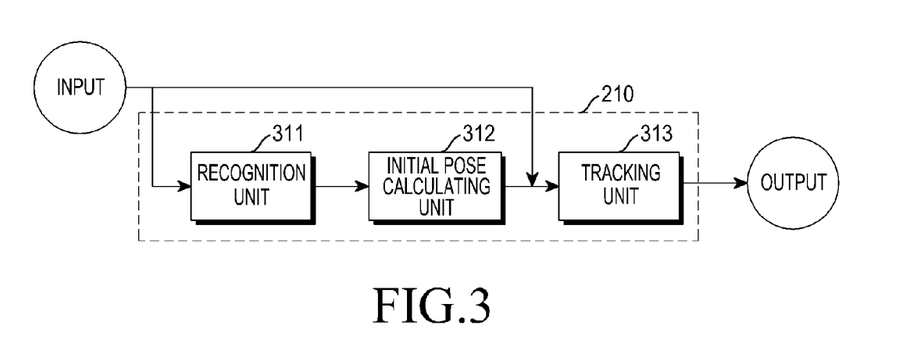
FIG. 3 illustrates a configuration of an AR processing unit according to an embodiment of the present disclosure.

FIG. 3 illustrates a configuration of an AR processing unit according to an embodiment of the present disclosure.

Referring to FIG. 3, the AR processing unit 210 may include a recognition unit 311, an initial pose calculation unit 312, and a tracking unit 313. Input image data may be output to the recognition unit 311 or the tracking unit 313, and the outputting may be performed by the recognition unit 311 and the tracking unit 313 in parallel.

The recognition unit 311 may identify an object on the input image data, based on at least a part of reference image data. The recognition unit 311 may use reference image data stored in an internal storage device or an external storage device of the electronic device 100, in order to recognize the object. For example, face recognition may need an external reference face database in order to recognize authenticated faces and recognize faces different the authenticated faces. Meanwhile, generally, for QR code recognition, only some specific rules are needed, and in general cases, the rules need not to be dynamically updated. Thus, internal reference data of the electronic device for the QR code may be provided.

The initial pose calculation unit 312 may calculate an initial pose of an object identified through detecting an interest point in the input image data.

The tracking unit 313 may dynamically track a change in a pose of an object in each of one or more pieces of input image data which is sequentially received through the camera unit.

The tracking unit 313 may acquire initial information by which the initial pose of the object of the input image data may be tracked, from the initial pose calculation unit 312. Thereafter, the tracking unit 313 may dynamically calculate the change in the pose of the object by consistently tracking the object in each of the input image data received sequentially.

The tracking unit 313 may output recognition information indicating types of the object and local information indicating the pose of the object, the object existing in the input image data received sequentially.

The tracking unit 313 may detect an amount of movement between the image data and select one among a plurality of object tracking methods, based on at least a part of the amount of the movement, according to an embodiment of the present disclosure.

The plurality of object tracking methods may include a first object tracking method and a second object tracking method, and the first object tracking method may require a calculation amount more than that of the second tracking method.

In various embodiments of the present disclosure, the first object tracking method may include a descriptor matching method, and the second object tracking method may include a patch matching method.

The descriptor matching method corresponds to a method which extracts features irrelevant to various changes of an area around an interest point, e.g. blurring, a change in a view point, and a change in illuminance; uses the extracted features to perform matching; and is strong in rapid movement or a change in illuminance. Representative algorithms of the descriptor matching method may include a Scale Invariant Feature Transform (SIFT) algorithm, a Speed Up Robust Features (SURF) algorithm, a Binary Robust Independent Elementary Features (BRIEF) algorithm, etc. In the descriptor matching method, since the reference image data is processed to be strong in various changes, the matching may be performed at a correct location between current image data and reference image data or a peripheral location therebetween.

The patch matching method corresponds to a method which does not process a local area around an interest point, and performs matching by using the local area as it is, so as to have higher accuracy. In the patch matching method, since the local area of reference image data is used as it is, the matching may be performed between the current image data and the reference image data with considerable accuracy. When interest points of the current image data and interest points of the reference image data are accurately matched through the patch matching method, a 3D location of the reference image data to be calculated later may be accurate and a shaking level may be low. The patch matching method may improve a performance of the matching through performing affine warping or projective warping of the local area by using an anticipated pose.

A matching process of the patch matching method may be performed between the reference image data and currently-input image data, or between previously-input image data and the currently-input image data.

When the amount of the movement is higher than a first threshold value, the tracking unit 313 may select the first object tracking method, or else the tracking unit 313 may select the second object tracking method, according to an embodiment of the present disclosure.

The tracking unit 313 may be configured to omit the tracking of an object when the amount of the movement is equal to or similar to zero, according to an embodiment of the present disclosure.

A configuration of the tracking unit, which selects one among the plurality of object tracking methods to track an object in image data, based on at least a part of the amount of the movement, will be described below with reference to FIG. 4.

Figure 4:
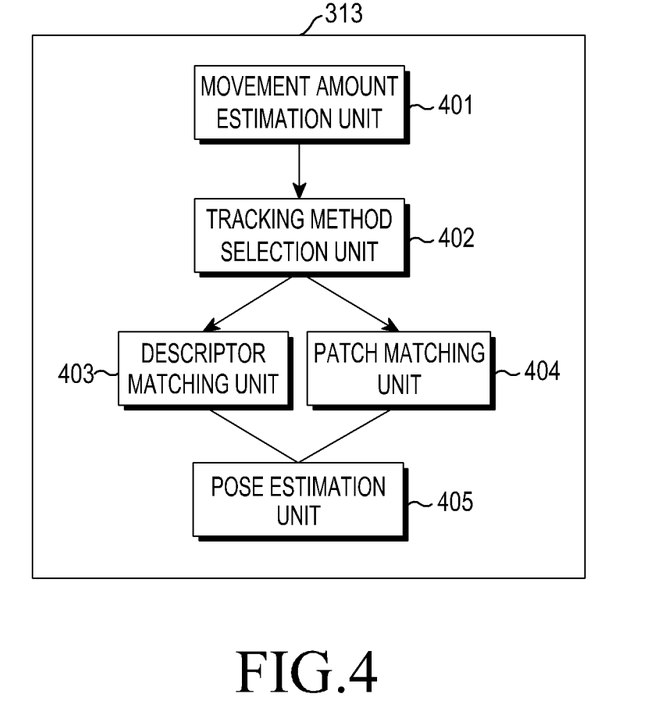
FIG. 4 illustrates a configuration of a tracking unit for tracking an object in image data in an electronic device according to an embodiment of the present disclosure.

FIG. 4 illustrates a configuration of a tracking unit for tracking an object in image data in an electronic device according to an embodiment of the present disclosure.

Referring to FIG. 4, the tracking unit 313 may include a pose anticipation unit (not illustrated), a movement amount estimation unit 401, a tracking method selection unit 402, a descriptor matching unit 403, a patch matching unit 404, and a pose estimation unit 405.

The pose anticipation unit may anticipate a pose of an object in image data to be input later through a pose of an object estimated from each of one or more pieces of the previously-input input image data.

The movement amount estimation unit 401 may measure an amount of movement of an object between currently-input image data and previously-input image data, and transmit the measured amount of the movement to the tracking method selection unit 402. The amount of the movement of the object may be measured in various methods. For example, the amount of the movement may be obtained by phase correlation calculation using Fourier transform for the previous-input image data and the currently-input image data. Further, for example, the amount of the movement may be calculated by a change in a measurement value of a motion sensor (e.g. an accelerometer sensor, a gyro sensor, and a compass sensor) of the electronic device, and may be obtained by optical flow calculation. Further, for example, when a measurement value is obtained by calculation using image data, the amount of movement may be also calculated for the whole image data, and the amount of movement data may be calculated as being limited to only an object of the whole image. Further, for example, when various interest objects are included in one image data, the amount of the movement may be separately calculated while the image data is divided into partial image data for each of the objects.

The tracking method selection unit 402 may select the descriptor matching method as the first object tracking method, or the patch matching method as the second object tracking method, according to the amount of the movement received from the movement amount estimation unit 401.

The tracking method selection unit 402 may omit a tracking operation for the object when the amount of the movement is equal to or similar to zero. The tracking method selection unit 402 may select the descriptor matching method when the amount of the movement is higher than a threshold value Mt previously selected for comparison of the amount of the movement. Further, the tracking method selection unit 402 may select the patch matching method when the amount of the movement is not higher than the previously-selected threshold value Mt. The tracking method selection unit 402 may select the descriptor matching method to perform a tracking operation for an object on the input image data when failing to track the object on the input image data by using the patch matching method.

The descriptor matching unit 403 may track an object on the input image data through the descriptor matching method.

The patch matching unit 404 may track an object on the input image data through the patch matching method.

The pose estimation unit 405 may calculate a position and a pose of an object on the currently-input image data, based on the result obtained by performing the matching through the descriptor matching unit 403 or the patch matching unit 404.

An operation of tracking an object in image data in the electronic device including the tracking unit illustrated in FIG. 4 will be described in detail with reference to FIG. 5.

Figure 5:
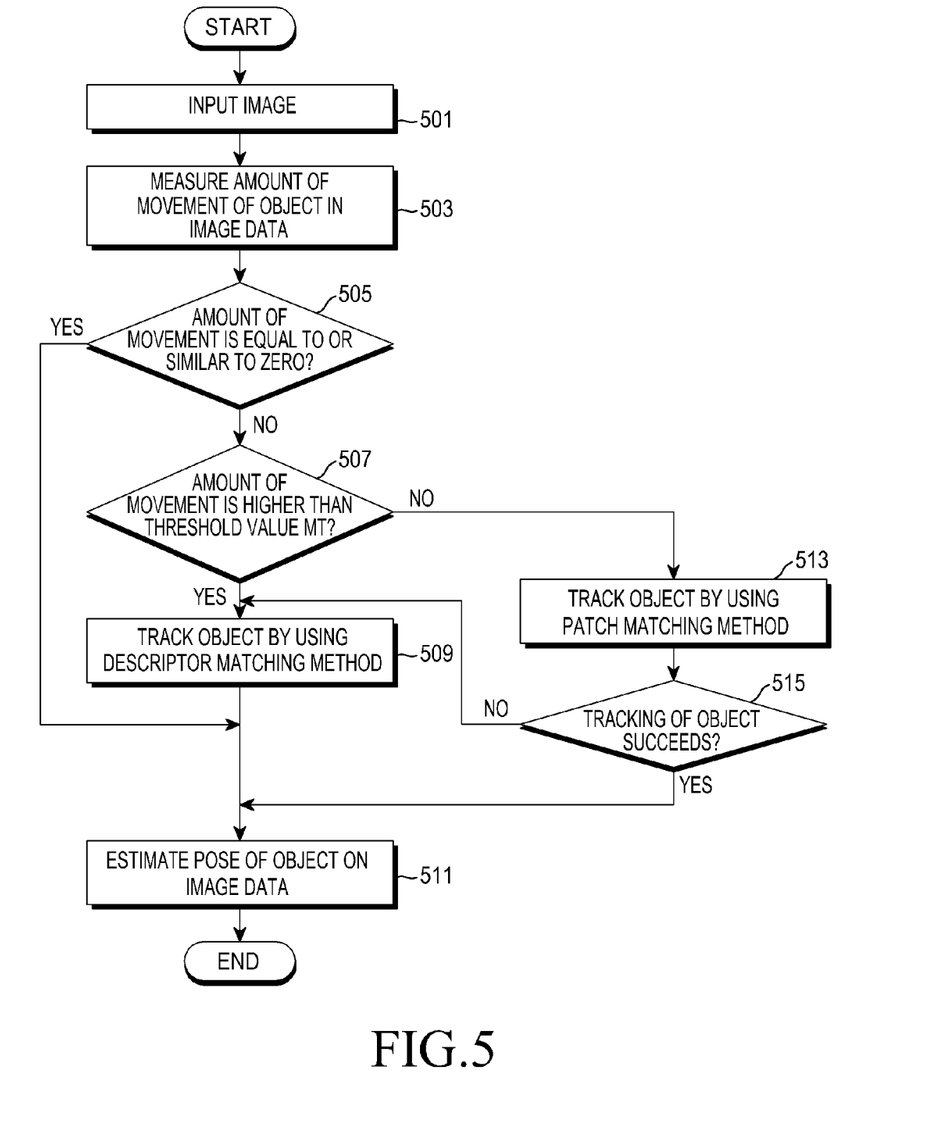
FIG. 5 is a flowchart illustrating an operation for tracking an object in image data in an electronic device according to an embodiment of the present disclosure.

FIG. 5 is a flowchart illustrating an operation for tracking an object in image data in an electronic device according to an embodiment of the present disclosure.

Referring to FIG. 5, when image data is input in operation 501, the movement amount estimation unit 401 may measure an amount of movement of an object between currently-input image data and previously-input image data and may transmit the measured amount to the tracking method selection unit 402, in operation 503.

When it is determined in operation 505 that the measured amount of the movement is not equal to or similar to zero, the tracking method selection unit 402 may compare the measured amount of the movement with the threshold value Mt, in operation 507. In operation 507, when it is determined that the measured amount of the movement is higher than the threshold value Mt, the tracking method selection unit 402 may request the descriptor matching unit 403 to perform an operation of tracking an object on the input image data.

In operation 509, the descriptor matching unit 403 may track an object on the input image data by using the descriptor matching method, and may transmit the object tracking result to the pose estimation unit 405.

In operation 511, the pose estimation unit 405 may calculate a pose of the object on the input image data, based on the object tracking result received from the descriptor matching unit 403.

In operation 507, when it is determined that the measured amount of the movement is not higher than the threshold value Mt, the tracking method selection unit 402 may request the patch matching unit 404 to perform an operation of tracking an object on the input image data.

In operation 513, the patch matching unit 404 may track an object on the input image data through the patch matching method. In operation 515, when it is determined that the tracking of the object on the image data using the patch matching method fails, the patch matching unit 404 informs the tracking method selection unit 402 of the failure of the object tracking. Thereafter, the tracking method selection unit 402 may request the descriptor matching unit 403 to perform an operation of tracking an object on the input image data at operation 509.

In operation 515, when it is determined that the tracking of the object on the image data using the patch matching method succeeds, the patch matching unit 404 may transmit the object tracking result to the pose estimation unit 405.

In operation 511, the pose estimation unit 405 may calculate a pose of the object on the input image data, based on the object tracking result received from the patch matching unit 404.

In operation 505, when it is determined that the measured amount of the movement is equal to or similar to zero, the tracking method selection unit 402 may omit the operation of tracking the object on the image data, and may transmit the measured amount of the movement to the pose estimation unit 405 at operation 511. In operation 511, the pose estimation unit 405 may calculate a pose of an object on the previously-input image data as the pose of the object on the input image data, through the measured amount of the movement received from the tracking method selection unit 402.

The tracking unit 313 may determine whether the image data satisfies one or more first conditions and/or whether a state of the electronic device satisfies one or more second conditions, and select one among the plurality of object tracking methods, based on at least a part of the determined result, according to another embodiment of the present disclosure.

The plurality of object tracking methods may include a first object tracking method and a second object tracking method, and the first object tracking method may require a calculation amount more than that of the second tracking method.

In various embodiments of the present disclosure, the first object tracking method may include a descriptor matching method, and the second object tracking method may include a patch matching method.

The tracking unit 313 may include a configuration for determining whether an amount of movement and/or an illuminance of the image data are higher than a selected threshold value or selected threshold values, as the first condition.

The tracking unit 313 may include a configuration for determining whether a remaining amount of electric charge of a battery included in the electronic device and/or an illuminance measured by the electronic device is higher than a selected threshold value or selected threshold values, as the second condition.

A configuration of the tracking unit, which selects one among the plurality of object tracking methods to track an object in image data, based on the first condition for the image data and the second condition for a state of the electronic device, will be described below with reference to FIG. 6.

Figure 6:
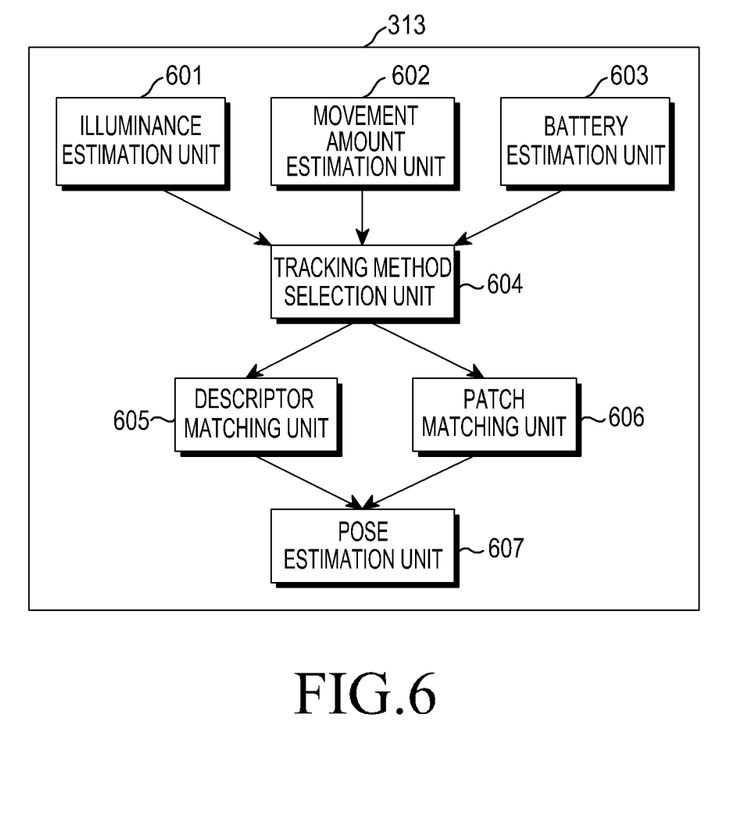
FIG. 6 illustrates a configuration of a tracking unit for tracking an object in image data in an electronic device according to an embodiment of the present disclosure.

FIG. 6 illustrates a configuration of a tracking unit for tracking an object in image data in an electronic device according to an embodiment of the present disclosure.

Referring to FIG. 6, the tracking unit 313 may include a pose anticipation unit (not illustrated), an illuminance estimation unit 601, a movement amount estimation unit 602, a battery estimation unit 603, a tracking method selection unit 604, a descriptor matching unit 605, a patch matching unit 606, and a pose estimation unit 607.

The pose anticipation unit, the movement amount estimation unit 602, the descriptor matching unit 605, the patch matching unit 606, and the pose estimation unit 607 perform the same function as that of the pose anticipation unit, the movement amount estimation unit 401, the descriptor matching unit 403, the patch matching unit 404, and the pose estimation unit 405 illustrated in FIG. 4, so that descriptions thereof will be omitted.

The illuminance estimation unit 601 may illuminance which is a brightness of an environment in which image data is currently being photographed. The illuminance tracking unit 601 may calculate the illuminance even by a measured value of an illuminance sensor of the electronic device 100, and may calculate the illuminance even by an average value of a brightness value which is extracted from pixels constituting image data.

The battery estimation unit 603 may measure a current remaining amount of electric charge of a battery of the electronic device 100.

When the remaining amount of electric charge of the battery measured through the battery estimation unit 603 is higher than a threshold value Bt previously selected for comparison of remaining amounts of electric charge of batteries, and an amount of movement of an object in the currently-input image data measured through the movement amount estimation unit 602 is higher than a threshold value Mt previously selected for comparison of amounts of movement, the tracking method selection unit 604 may select the descriptor matching method.

When the illuminance measured through the illuminance estimation unit 601 is higher than a threshold value It previously selected for comparison of illuminance, and an amount of movement of an object on the currently-input image data measured through the movement amount estimation unit 602 is higher than a threshold value Mt previously selected for comparison of amounts of movement, the tracking method selection unit 604 may select the descriptor matching method.

When the remaining amount of electric charge of the battery measured through the battery estimation unit 603 is higher than a threshold value Bt previously selected for comparison of remaining amounts of electric charge of batteries, the illuminance measured through the illuminance estimation unit 601 is higher than a threshold value It previously selected for comparison of illuminance, and the amount of movement of an object on the currently-input image data measured through the movement amount estimation unit 602 is higher than a threshold value Mt previously selected for comparison of amounts of movement, the tracking method selection unit 604 may select the descriptor matching method.

When the remaining amount of electric charge of the battery measured through the battery estimation unit 603 is not higher than the threshold value Bt, or the amount of the movement measured through the movement amount estimation unit 602 is not higher than the threshold value Mt, the tracking method selection unit 604 may select the patch matching method.

When the remaining amount of electric charge of the battery measured through the battery estimation unit 603 is not higher than the threshold value Bt, the illuminance measured through the illuminance estimation unit 601 is not higher than the threshold value IT, or the amount of the movement measured through the movement amount estimation unit 602 is not higher than the threshold value Mt, the tracking method selection unit 604 may select the patch matching method.

The tracking method selection unit 604 may omit a tracking operation for the object when the amount of the movement is equal to or similar to zero.

The tracking method selection unit 604 may select the descriptor matching method to perform a tracking operation for an object on the input image data when failing to track the object on the input image data by using the patch matching method.

An operation of tracking an object in image data in the electronic device including the tracking unit illustrated in FIG. 6 will be described in detail with reference to FIGS. 7 to 9.

Figure 7:
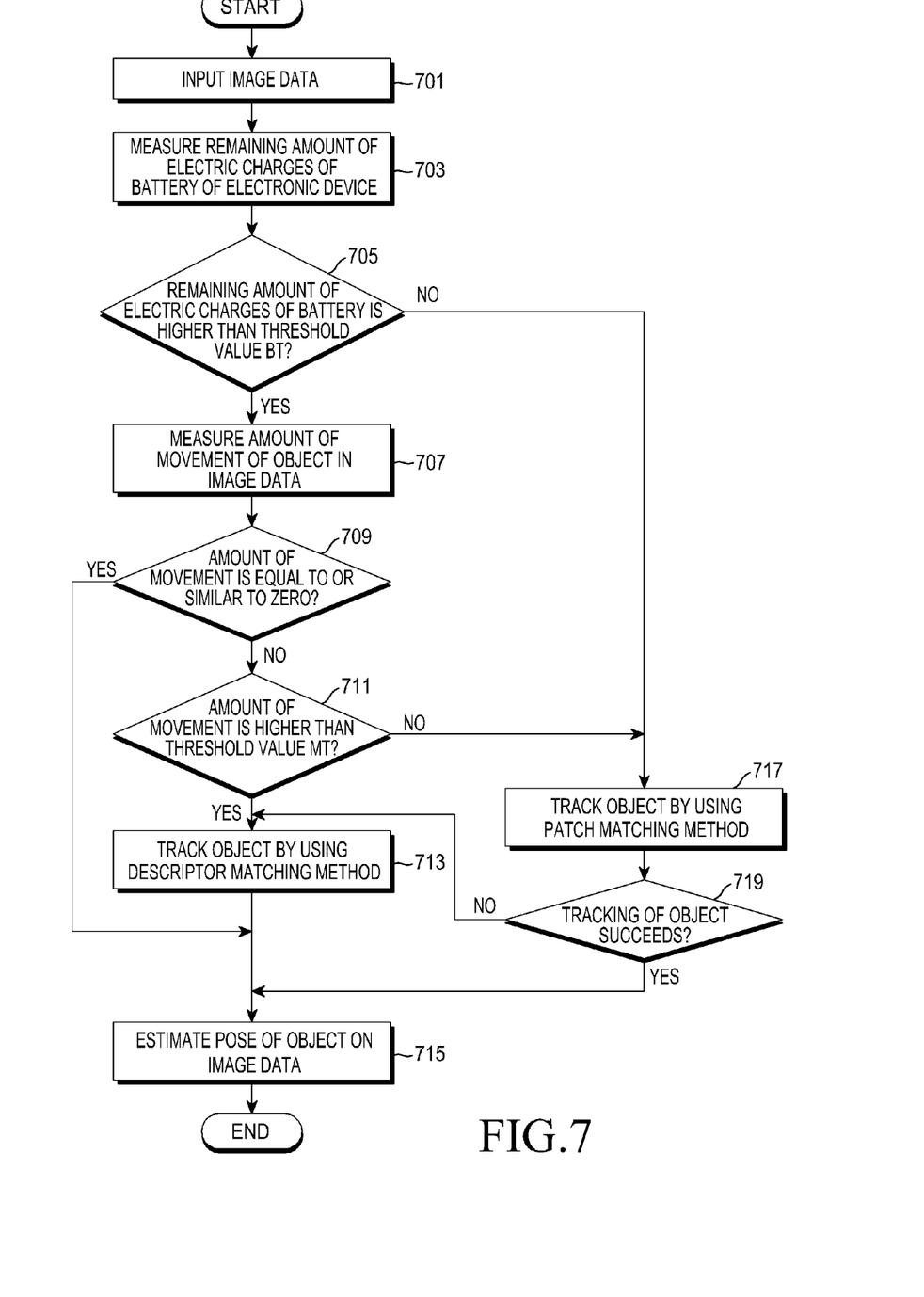
FIGS. 7, 8, and 9 are flowcharts illustrating operations for tracking an object in image data in an electronic device according to various embodiments of the present disclosure.

FIG. 7 is a flowchart illustrating an operation of tracking an object in image data by using a remaining amount of a battery and an amount of movement in the electronic device according to an embodiment of the present disclosure.

Referring to FIG. 7, when image data is input in operation 701, the battery estimation unit 603 may measure a remaining amount of electric charge of a battery of the electronic device 100, and may transmit the measured amount to the tracking method selection unit 604, in operation 703.

In operation 705, the tracking method selection unit 604 may compare the measured remaining amount of electric charge of the battery with the threshold value Bt.

In operation 705, when the measured remaining amount of electric charge of the battery is higher than the threshold value Bt, the tracking method selection unit 604 may wait to receive the amount of the movement from the movement amount estimation unit 602.

In operation 707, the movement amount estimation unit 602 may measure an amount of movement of an object between currently-input image data and previously-input image data, and transmit the measured amount of the movement to the tracking method selection unit 604.

When it is determined in operation 709 that the measured amount of the movement is not equal to or similar to zero, the tracking method selection unit 604 may compare the measured amount of the movement with the threshold value Mt, in operation 711. In operation 711, when it is determined that the measured amount of the movement is higher than the threshold value Mt, the tracking method selection unit 604 may request the descriptor matching unit 605 to perform an operation of tracking an object on the input image data.

In operation 713, the descriptor matching unit 605 may track an object on the input image data by using the descriptor matching method, and may transmit the object tracking result to the pose estimation unit 607.

In operation 715, the pose estimation unit 607 may calculate a pose of the object on the input image data, based on the object tracking result received from the descriptor matching unit 605.

In operation 705, when it is determined that the measured remaining amount of electric charge of the battery is not higher than the threshold value Bt, the tracking method selection unit 604 may request the patch matching unit 606 to perform an operation of tracking an object on the input image data.

Further, in operation 711, when it is determined that the measured amount of the movement is not higher than the threshold value Mt, the tracking method selection unit 604 may request the patch matching unit 606 to perform an operation of tracking an object on the input image data.

In operation 717, the patch matching unit 606 may track an object on the input image data through the patch matching method.

In operation 719, when it is determined that the tracking of the object on the image data using the patch matching method fails, the patch matching unit 606 informs the tracking method selection unit 604 of the failure of the object tracking. Thereafter, the tracking method selection unit 604 may request the descriptor matching unit 605 to perform an operation of tracking an object on the input image data at operation 713.

In operation 719, when it is determined that the tracking of the object on the image data using the patch matching method succeeds, the patch matching unit 606 may transmit the object tracking result to the pose estimation unit 607 at operation 715.

In operation 715, the pose estimation unit 607 may calculate a pose of the object on the input image data, based on the object tracking result received from the patch matching unit 606.

In operation 709, when it is determined that the measured amount of the movement is equal to or similar to zero, the tracking method selection unit 604 may omit the operation of tracking the object on the image data, and may transmit the measured amount of the movement to the pose estimation unit 607. In operation 715, the pose estimation unit 607 may calculate a pose of an object on the previously-input image data as the pose of the object on the input image data, through the measured amount of the movement received from the tracking method selection unit 604.

Figure 8:
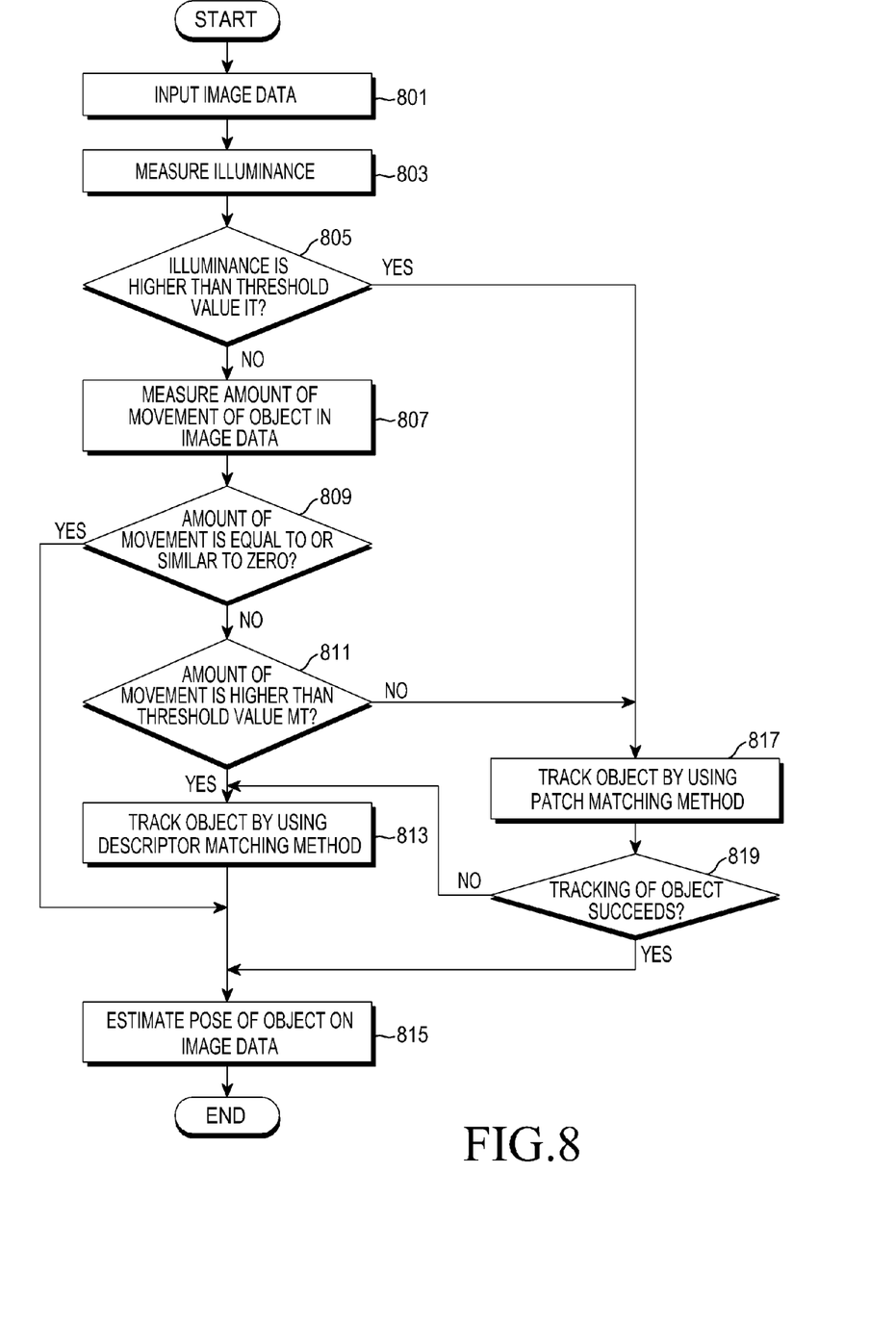

FIG. 8 is a flowchart illustrating an operation of tracking an object in image data by using an illuminance and an amount of movement in an electronic device according to an embodiment of the present disclosure.

Referring to FIG. 8, when image data is input in operation 801, the illuminance estimation unit 601 may measure an illuminance which is a brightness of an environment in which image data is currently being photographed through the electronic device 100, and may transmit the measured illuminance to the tracking method selection unit 604, in operation 803.

In operation 805, the tracking method selection unit 604 may compare the measured illuminance with the threshold value It.

In operation 805, when the measured illuminance is not higher than the threshold value It, the tracking method selection unit 604 may wait to receive the amount of the movement from the movement amount estimation unit 602.

In operation 807, the movement amount estimation unit 602 may measure an amount of movement of an object between currently-input image data and previously-input image data, and transmit the measured amount of the movement to the tracking method selection unit 604.

When it is determined in operation 809 that the measured amount of the movement is not equal to or similar to zero, the tracking method selection unit 604 may compare the measured amount of the movement with the threshold value Mt, in operation 811. In operation 811, when it is determined that the measured amount of the movement is higher than the threshold value Mt, the tracking method selection unit 604 may request the descriptor matching unit 605 to perform an operation of tracking an object on the input image data.

In operation 813, the descriptor matching unit 605 may track an object on the input image data by using the descriptor matching method, and may transmit the object tracking result to the pose estimation unit 607.

In operation 815, the pose estimation unit 607 may calculate a pose of the object on the input image data, based on the object tracking result received from the descriptor matching unit 605.

In operation 805, when it is determined that the measured illuminance is higher than the threshold value It, the tracking method selection unit 604 may request the patch matching unit 606 to perform an operation of tracking an object on the input image data at operation 817.

Further, in operation 811, when it is determined that the measured amount of the movement is not higher than the threshold value Mt, the tracking method selection unit 604 may request the patch matching unit 606 to perform an operation of tracking an object on the input image data at operation 817.

In operation 817, the patch matching unit 606 may track an object on the input image data through the patch matching method.

In operation 819, when it is determined that the tracking of the object on the image data using the patch matching method fails, the patch matching unit 606 informs the tracking method selection unit 604 of the failure of the object tracking. Thereafter, the tracking method selection unit 402 may request the descriptor matching unit 605 to perform an operation of tracking an object on the input image data.

In operation 819, when it is determined that the tracking of the object on the image data using the patch matching method succeeds, the patch matching unit 606 may transmit the object tracking result to the pose estimation unit 607 .

In operation 815, the pose estimation unit 607 may calculate a pose of the object on the input image data, based on the object tracking result received from the patch matching unit 606.

In operation 809, when it is determined that the measured amount of the movement is equal to or similar to zero, the tracking method selection unit 604 may omit the operation of tracking the object on the image data, and may transmit the measured amount of the movement to the pose estimation unit 607. In operation 815, the pose estimation unit 607 may calculate a pose of an object on the previously-input image data as the pose of the object on the input image data, through the measured amount of the movement received from the tracking method selection unit 604.

Figure 9:
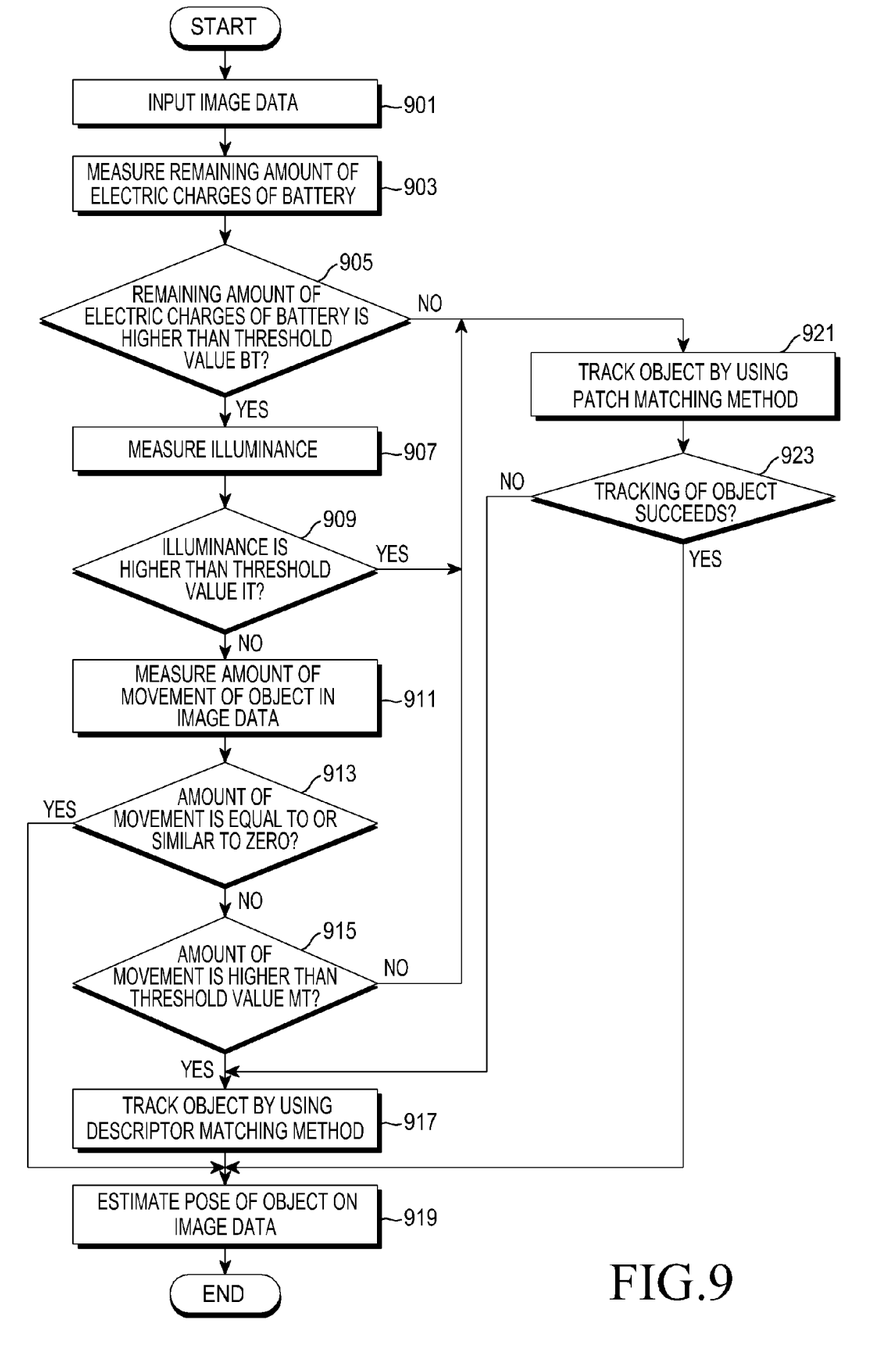

FIG. 9 is a flowchart illustrating an operation of tracking an object in image data by using a remaining amount of electric charge of a battery, an illuminance, and an amount of movement in an electronic device according to an embodiment of the present disclosure.

Referring to FIG. 9, when image data is input in operation 901, the battery estimation unit 603 may measure a remaining amount of electric charge of a battery of the electronic device 100, and may transmit the measured amount to the tracking method selection unit 604, in operation 903.

In operation 905, the tracking method selection unit 604 may compare the measured remaining amount of electric charge of the battery with the threshold value Bt.

In operation 905, when the measured remaining amount of electric charge of the battery is higher than the threshold value Bt, the tracking method selection unit 604 may wait to receive the measured illuminance from the illuminance estimation unit 601.

In operation 907, the illuminance estimation unit 601 may measure an illuminance which is a brightness of an environment in which image data is currently being photographed through the electronic device 100, and may transmit the measured illuminance to the tracking method selection unit 604.

In operation 909, the tracking method selection unit 604 may compare the measured illuminance with the threshold value It.

In operation 909, when it is determined that the measured illuminance is not higher than the threshold value It, the tracking method selection unit 604 may wait to receive the amount of the movement from the movement amount estimation unit 602.

In operation 911, the movement amount estimation unit 602 may measure an amount of movement of an object between currently-input image data and previously-input image data, and transmit the measured amount of the movement to the tracking method selection unit 604.

When it is determined in operation 913 that the measured amount of the movement is not equal to or similar to zero, the tracking method selection unit 604 may compare the measured amount of the movement with the threshold value Mt, in operation 915. In operation 915, when it is determined that the measured amount of the movement is higher than the threshold value Mt, the tracking method selection unit 604 may request the descriptor matching unit 605 to perform an operation of tracking an object on the input image data.

In operation 917, the descriptor matching unit 605 may track an object on the input image data by using the descriptor matching method, and may transmit the object tracking result to the pose estimation unit 607.

In operation 919, the pose estimation unit 607 may calculate a pose of the object on the input image data, based on the object tracking result received from the descriptor matching unit 605.

In operation 905, when it is determined that the measured remaining amount of electric charge of the battery is not higher than the threshold value Bt, the tracking method selection unit 604 may request the patch matching unit 606 to perform an operation of tracking an object on the input image data at operation 921.

Further, in operation 909, when it is determined that the measured illuminance is higher than the threshold value It, the tracking method selection unit 604 may request the patch matching unit 606 to perform an operation of tracking an object on the input image data.

Further, in operation 915, when it is determined that the measured amount of the movement is not higher than the threshold value Mt, the tracking method selection unit 604 may request the patch matching unit 606 to perform an operation of tracking an object on the input image data at operation 921.

In operation 921, the patch matching unit 606 may track an object on the input image data through the patch matching method.

In operation 923, when it is determined that the tracking of the object on the image data using the patch matching method fails, the patch matching unit 606 informs the tracking method selection unit 604 of the failure of the object tracking. Thereafter, the tracking method selection unit 604 may request the descriptor matching unit 605 to perform an operation of tracking an object on the input image data at operation 917.

In operation 923, when it is determined that the tracking of the object on the image data using the patch matching method succeeds, the patch matching unit 606 may transmit the object tracking result to the pose estimation unit 607 at operation 915.

In operation 919, the pose estimation unit 607 may calculate a pose of the object on the input image data, based on the object tracking result received from the patch matching unit 606.

In operation 913, when it is determined that the measured amount of the movement is equal to or similar to zero, the tracking method selection unit 604 may omit the operation of tracking the object on the image data, and may transmit the measured amount of the movement to the pose estimation unit 607. In operation 919, the pose estimation unit 607 may calculate a pose of an object on the previously-input image data as the pose of the object on the input image data, through the measured amount of the movement received from the tracking method selection unit 604.

The electronic device and the method of operating the electronic device according to various embodiments of the present disclosure may be realized by a computer-readable code in a computer-readable recording medium. The computer-readable recording medium includes all the types of recording devices in which data readable by a computer system are stored. As for such a recording medium, for example, a ROM, a RAM, an optical disc, a magnetic tape, a floppy disc, a hard disc, and a non-volatile memory may be used.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a memory configured to store a plurality of digital images; and
a processor,
wherein the processor is configured to track movement of an object recognized in the plurality of digital images, and
wherein the processor is further configured to:
measure an amount of movement between the plurality of digital images, select one of a plurality of object tracking methods based at least in part on a comparison of the measured amount of the movement to a specified threshold, and select the rest of the plurality of object tracking methods, when it is determined that tracking of an object on the plurality of digital images using the selected object tracking method fails.

2. The electronic device of claim 1,
wherein the plurality of object tracking methods comprises a first object tracking method and a second object tracking method, and
wherein the first object tracking method requires a calculation amount more than that of the second object tracking method.

3. The electronic device of claim 2, wherein the first object tracking method comprises a descriptor matching method, and the second object tracking method comprises a patch matching method.

4. The electronic device of claim 2,
wherein, when the amount of the movement is higher than a first threshold, the processor selects the first object tracking method, and
wherein, when the amount of the movement is not higher than the first threshold, the processor selects the second object tracking method.

5. The electronic device of claim 1, wherein, when the amount of the movement is one of equal to zero and similar to zero, the processor omits the tracking of the object.

6. The electronic device of claim 1, wherein the processor is further configured to select one among the plurality of object tracking methods, based on at least one of an illuminance measured by the electronic device or an illuminance calculated from the plurality of digital images.

7. The electronic device of claim 1, wherein the processor is further configured to select one among the plurality of object tracking methods, based at least in part on a remaining amount of electric charge of a battery included in the electronic device.

8. An electronic device comprising:
a memory configured to store a plurality of digital images; and
a processor,
wherein the processor is configured to track movement of an object recognized in the plurality of digital images, and
wherein the processor is further configured to:
determine:
(i) whether the digital images satisfies at least one of first conditions, wherein the first conditions comprise a determination that an amount of measured movement is higher than a specified threshold, and
(ii) whether a state of the electronic device satisfy at least one of second conditions, and
select one among a plurality of object tracking methods based at least in part on the result of the determining.

9. The electronic device of claim 8, wherein the first conditions comprise a configuration to determine whether an illuminance of the plurality of digital images is higher than at least one of selected threshold values.

10. The electronic device of claim 8, wherein the second conditions comprise a configuration to determine whether at least one of a remaining amount of electric charge of a battery included in the electronic device and an illuminance measured by the electronic device is higher than at least one of selected threshold values.

11. A method of operating an electronic device, the method comprising:
tracking movement of an object recognized from a plurality of digital images,
wherein the tracking of the movement comprises:
measuring an amount of movement between the plurality of digital images;
selecting one among a plurality of object tracking methods, based at least in part on a comparison of the measured amount of the movement to a specified threshold; and
selecting the rest of the plurality of object tracking methods, when it is determined that tracking of an object on the plurality of digital images using the selected object tracking method fails.

12. The method of claim 11,
wherein the plurality of object tracking methods comprises a first object tracking method and a second object tracking method, and
wherein the first object tracking method requires a calculation amount more than that of the second object tracking method.

13. The method of claim 12, wherein the first object tracking method comprises a descriptor matching method, and the second object tracking method comprises a patch matching method.

14. The method of claim 11, wherein the selecting of one among the plurality of object tracking methods comprises:
when the amount of the movement is higher than a first threshold, selecting the first object tracking method, and
when the amount of the movement is not higher than the first threshold, selecting the second object tracking method.

15. The method of claim 11, wherein, when the amount of the movement is one of equal to zero and similar to zero, the tracking of the object is omitted.

16. The method of claim 11, wherein the tracking of the movement comprises selecting one among the plurality of object tracking methods, based on at least one of an illuminance measured by the electronic device or an illuminance calculated from the plurality of digital images.

17. The method of claim 11,
wherein the electronic device comprises a battery, and
wherein the tracking of the movement comprises selecting one among the plurality of object tracking methods, based at least in part on a remaining amount of electric charge of the battery.

18. A method of operating an electronic device, the method comprising:
tracking movement of an object recognized on a plurality of digital images, and
wherein the tracking of the movement comprises:
(i) determining whether the plurality of digital images satisfy at least one of first conditions, wherein the first conditions comprise a determination that an amount of measured movement is higher than a specified threshold, and
(ii) determining whether a state of the electronic device satisfies at least one of second conditions, and
selecting one among a plurality of object tracking methods based at least in part on the result of the determining.

19. The method of claim 18, wherein the determining of whether the plurality of digital images satisfy at least one of the first conditions comprises determining whether an illuminance of the plurality of digital images is higher than at least one of selected threshold values.

20. The method of claim 18,
wherein the electronic device comprises a battery, and
wherein the determining of whether the state of the electronic device satisfies at least one of the second conditions comprises determining whether at least one of a remaining amount of electric charge of the battery and an illuminance measured by the electronic device is higher than at least one of selected threshold values.

* * * * *